United States Patent [19]

Lynch et al.

[11] 4,383,551
[45] May 17, 1983

[54] ANTI-HAMMER DEVICE FOR PULSED LIQUID-MERGING SYSTEM

[75] Inventors: M. Dee Lynch, Beaverton; James W. Bernklau, Tigard, both of Oreg.

[73] Assignee: Quadratec Associates, Beaverton, Oreg.

[21] Appl. No.: 347,104

[22] Filed: Feb. 9, 1982

[51] Int. Cl.³ .............................................. F16L 55/04
[52] U.S. Cl. .................................. 137/593; 137/606; 138/30; 236/12 A
[58] Field of Search ................ 73/199; 137/3, 568, 137/593, 606; 138/26, 30; 220/85 B; 236/12 M; 417/542

[56] References Cited

U.S. PATENT DOCUMENTS 1,885,457  11/1932  Lord et al. .................... 138/30 X
2,474,512   6/1949  Bechtold et al. ................ 138/30
4,256,438   3/1981  Schillinger .................. 417/542 X

FOREIGN PATENT DOCUMENTS 2614509  10/1977  Fed. Rep. of Germany ... 236/12 A

Primary Examiner—Stephen Marcus
Assistant Examiner—Mark John Thronson
Attorney, Agent, or Firm—Kolisch, Hartwell & Dickinson

[57] ABSTRACT

An anti-hammer device for use in a two-line liquid-mixing system, where liquids from the two lines are pulse-blended and merged into a single output stream. The device includes a housing divided by a flexible diaphragm into two liquid-receiving plenums, each of which communicates with a different one of the two lines.

1 Claim, 3 Drawing Figures

4,383,551

ANTI-HAMMER DEVICE FOR PULSED LIQUID-MERGING SYSTEM

BACKGROUND AND SUMMARY OF THE INVENTION

This invention relates to a liquid-supply system, and more particularly to an anti-hammer device usable in such a system where liquids from two conduit streams are pulse-blended, and merged into a single output stream. The invention, while having clear applicability in a number of different settings, is described hereinbelow in connection with a film-processing, liquid-temperature-control system in which it has been found to offer particular utility.

By way of illustration, recently proposed for use in various film-processing machines is a system which, in recurrent pulses, alternately blends hot and cold water (from a conventional water-supply system) into a single temperature-controlled output stream. A full disclosure of this system is found in our copending U.S. patent application, Ser. No. 347,103, filed Feb. 19, 1982, for "DIFFERING-TEMPERATURE WATER-MIXING APPARATUS AND METHOD USING PULSED, DUTY-CYCLE TEMPERATURE CONTROL". In this system, as well as in other kinds of two-liquid pulse-blending systems, the quick-response alternate "shut-offs" of liquid flow in the two liquid input conduits presents a serious, and potentially quite irritating and damaging, liquid-hammer condition in the upstream plumbing.

A general object of the present invention is to provide a unique anti-hammer device usable in a two-liquid-stream plumbing system to eliminate substantially all hammer effects in both upstream conduits in the system.

According to a preferred embodiment of the invention, the anti-hammer device takes the form of a split housing which is separated by a flexible diaphragm into two liquid-receiving plenums. Each plenum is connected to a different one of the two liquid-supply conduits in a plumbing system-upstream from where valving, for flow control, takes place. When liquid flow in one conduit is shut off, and flow in the other is started, the diaphragm flexes instantly away from that plenum in the device which is connected to the "shut-off" conduit due to the instantaneous pressure differential created. This action, utilizing the lower-pressure liquid condition in the "flowing" side of the system, absorbs "shut-off" shock, and prevents hammer in the associated conduit. The diaphragm flexes in the opposite direction when flow in the "other" conduit is stopped, and flow in the "one" conduit begun.

DETAILED DESCRIPTION OF THE INVENTION

Figure 1:
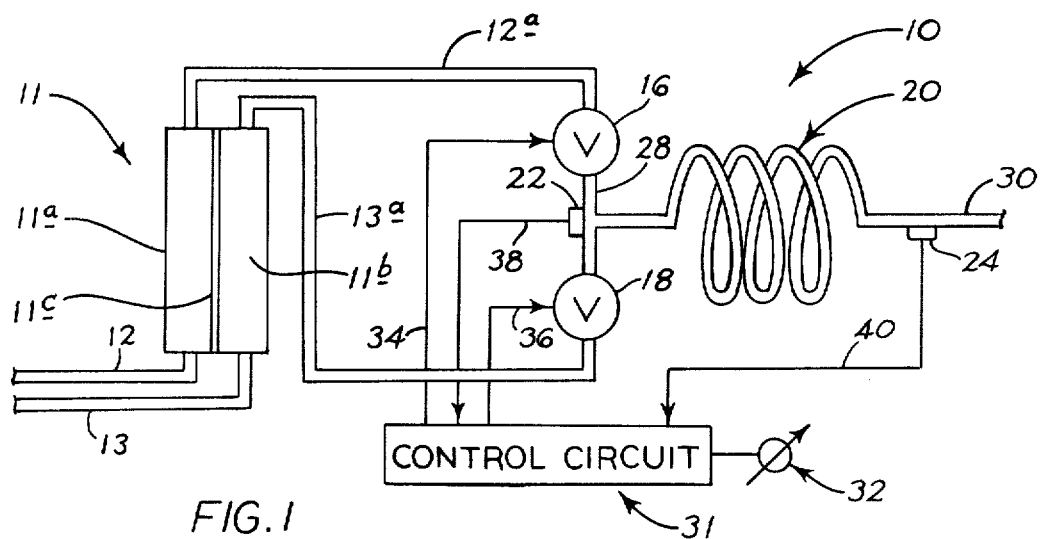
FIG. 1 is a simplified fragmentary diagram illustrating a plumbing portion of a film-processing machine employing an anti-hammer device which is constructed according to the present invention.

Turning now to the drawings, and referring first to FIG. 1, indicated generally at 10 is a temperature-controlling, liquid-stream blending apparatus including a shared anti-hammer device 11 which is constructed in accordance with the present invention. Apparatus 10 forms part of a film-processing machine such as that disclosed in U.S. Pat. No. 3,695,162. This apparatus is shown connected for use with a conventional water supply system, including the usual cold water supply conduit 12 and hot water supply conduit 13. Conduits 12, 13 herein have cross-sectional diameters of about $\frac{3}{8}$-inches.

Generally speaking, device 11 includes a split housing with mirror-image halves 11a, 11b, divided into left and right fluid chambers, or plenums, (in FIG. 1) by a central flexible diaphragm 11c. In general terms, the diaphragm flexes back and forth between these chambers as water alternately flows, as will be explained, in pulses from conduits 12, 13.

Cold-water conduit 12 connects with the base of the left chamber in device 11, and hot-water conduit 13 connects with the base of the right chamber in the device. Extending from the top of the left chamber is a conduit 12a, and extending from the top of the right chamber is a conduit 13a. Conduits 12a, 13a have substantially the same inside diameters as conduits 12, 13.

Apparatus 10 further includes a pair of solenoid-actuated valves 16, 18, a copper heat-exchanging coil 20, a pair of thermistors 22, 24, and a control circuit 31. The inlets of valves 16, 18 are connected directly to conduits 12a, 13a, respectively, and their outlets are connected to the upper and lower ends (in FIG. 1) of a T-coupling 28. That portion of coupling 28 which extends to the right in FIG. 1 feeds a single, merged, output water stream to the feed end of coil 20 (the left end thereof in FIG. 1). The discharge end of coil 20 (the right end thereof in FIG. 1) connects with a suitable discharge conduit 30.

A control circuit 31, which includes a potentiometer shown schematically at 32 for selecting an output-stream regulation temperature, is connected electrically for actuating the solenoids for valves 16, 18. Such connections are indicated by lines 34, 36, respectively. Information respecting the temperature of water at two locations in the apparatus (i.e., substantially adjacent the opposite ends of coil 20), is fed to the control circuit from thermistors 22,24, as indicated by lines 38, 40, respectively. In accordance with the manner in which apparatus 10 operates herein, whenever valve 16 is open, valve 18 is closed, and vice versa.

Figures 2, 3:
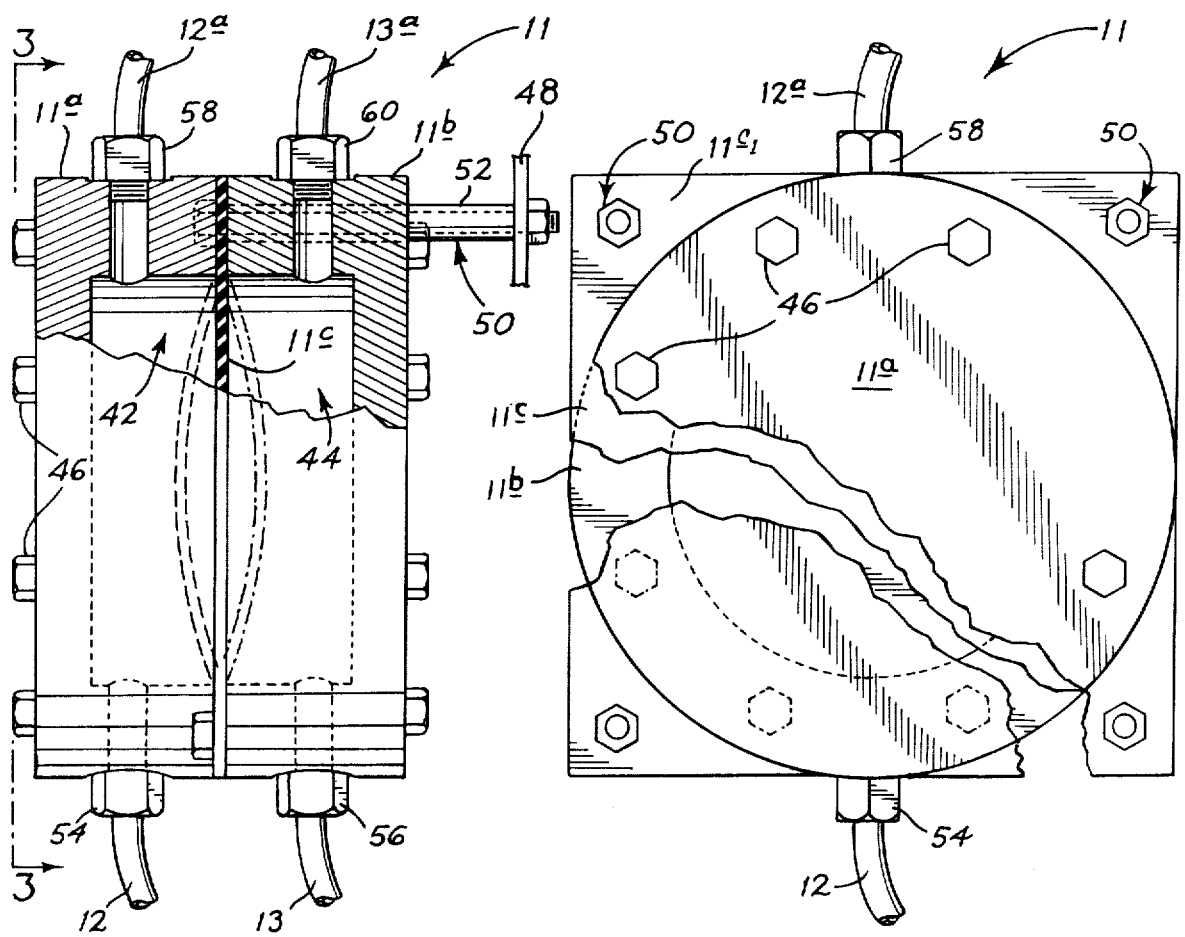
FIG. 2 is an enlarged fragmentary side view of the device shown schematically in FIG. 1, with portions of the device broken away to illustrate details of construction.
FIG. 3 is a view taken generally along line 3—3 in FIG. 2, also with portions broken away.

Turning attention now to FIGS. 2 and 3, the two halves making up the housing in device 11 are generally cylindrical in construction, and are formed of any suitable material such as rigid plastic. Each of these halves has an outside diameter herein of about 5-inches, an inside diameter of about 3.5-inches, and an inside axial depth of about 1-inch. The overall axial length of each half is about 1.5-inches. The left and right chambers referred to above in connection with FIG. 1, are shown at 42, 44, respectively, in FIG. 2, with chamber 42 residing in housing half 11a, and chamber 44 in housing half 11b.

Diaphragm 11c is formed of a conventional reinforced neoprene diaphragm material with a thickness of about $\frac{1}{8}$-inches, and a square outline (see FIG. 3) which is about 5-inches on a side. With the diaphragm seated as shown between the two halves of the housing, the four corners of the diaphragm project as is shown clearly in FIG. 3, and function, as will shortly be explained, to enable ready shock mounting of device 11.

The housing halves and the diaphragm are secured by eight nut and bolt assemblies such as those shown at 46. The entire assembly is mounted on any suitable rigid structure, such as the frame plate shown fragmentarily at 48 in FIG. 2, by means of four nut and bolt assemblies, such as assemblies 50 which include stand-off collars, like collar 52. These collars are disposed between a side of diaphragm 11c (the right side thereof in FIG. 2) and plate 48.

Completing a description of the structure which is shown in solid lines in FIGS. 2 and 3, conduits 12, 13 communicate with the insides of plenums 42, 44 through suitable fittings 54, 56, respectively. Similarly, conduits 12a, 13a communicate with the top sides of these two plenums through like fittings 58, 60, respectively.

Under circumstances with no water flowing in apparatus 10, the diaphragm in device 11 occupies the solid outline (non-flexed) condition shown for it in FIG. 2. When, for example, valve 16 is opened to allow water to flow in conduits 12, 12a, such flow takes place through plenum 42, and results in diaphragm 11c flexing and bowing to the left in FIG. 2, as indicated by the dashed line outline of the diaphragm in this figure. When, in the normal course of operation of apparatus 10, valve 16 quickly closes and valve 18 quickly opens, water flow in conduits 12, 12a stops, and water flow begins in conduits 13, 13a through plenum 44. On this occurrence, the diaphragm quickly flexes to the right in FIG. 2, as shown by the dash-dot outline of the diaphragm, with such flexing acting to transfer shock to the lower-pressure side of the system, thus to absorb liquid-hammer shock in conduit 12. When apparatus 10 cycles to re-open valve 16 and to close valve 18, a similar event takes place, with the diaphragm flexing back to its dashed outline condition in FIG. 2, thus to absorb shock in conduit 13. Because of the manner in which device 11 is mounted on plate 48, the flexible projecting corners, such as corner 11c, (see FIG. 3) of the diaphragm act as shock isolators between the device and the plate.

The device of the invention thus offers a unique solution to the problem of liquid-hammer in a two-conduit system. The device is simple and inexpensive in construction, and extremely effective and reliable in performance.

While a preferred embodiment of the invention has been described hereinabove, it is appreciated that variations and modifications may be made without departing from the spirit of the invention.

It is claimed and desired to secure as Letters Patent:

1. In combination with a liquid-supply system, wherein liquids from two different input conduits are alternately pulse-blended and merged into a single output conduit, with liquid from substantially one-only of such two input conduits flowing at a given time into the output conduit, a shared anti-hammer device for minimizing liquid hammer in both of the input conduits comprising a housing defining an inside void space, a flexible diaphragm secured to said housing and spanning said void space so as to divide the same into two liquid-receiving through-flow plenums, and for each plenum, a pair of fittings connecting the plenum for through-flow liquid communication with a different one of such two input conduits.

* * * * *